June 21, 1966   S. A. SVENSSON   3,256,903
VACUUM REGULATOR
Filed Nov. 20, 1962   2 Sheets-Sheet 1
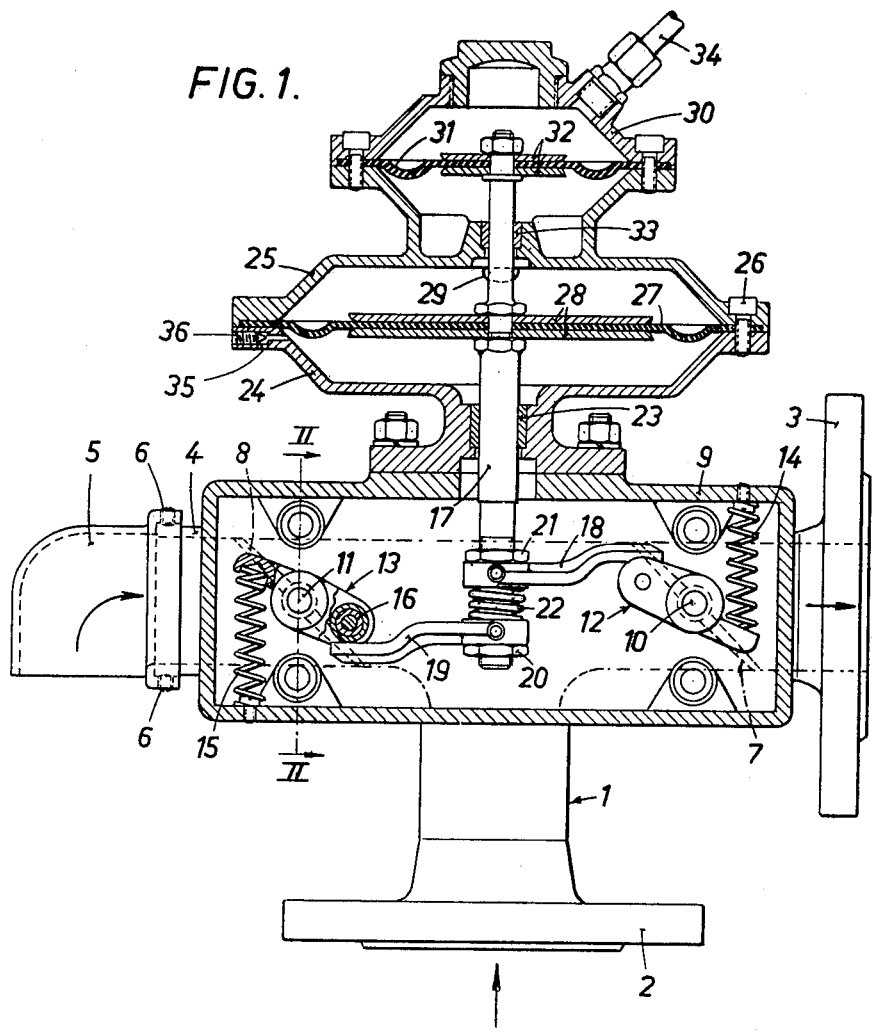
INVENTOR:
SVEN ALVAR SVENSSON,
By Ernest D. Marmorek,
His Attorney.

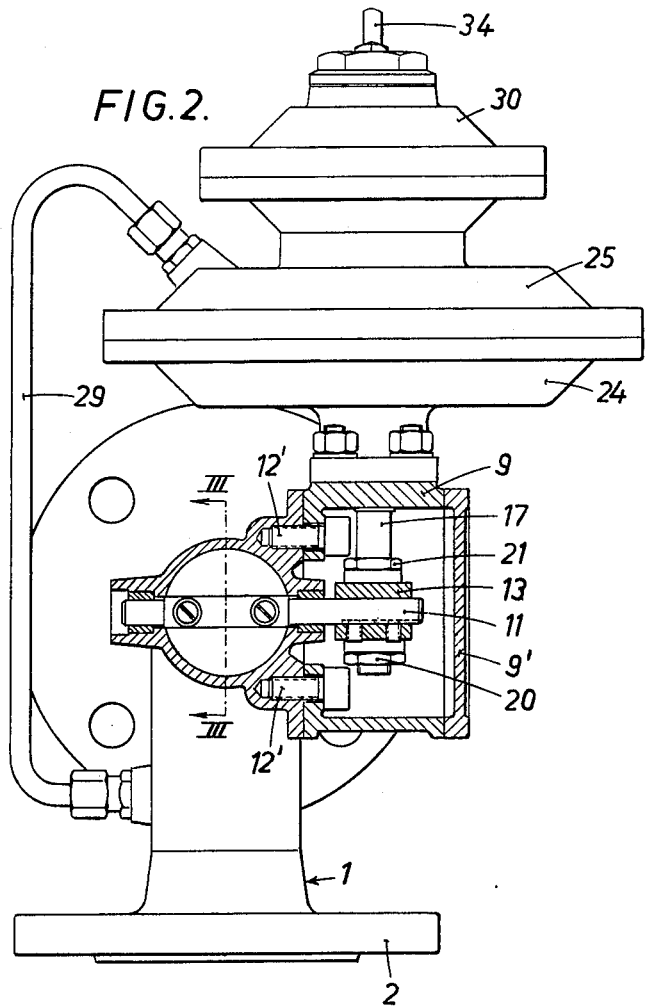
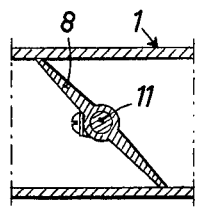
INVENTOR:
SVEN ALVAR SVENSSON,
His Attorney.

United States Patent Office 3,256,903
Patented June 21, 1966

3,256,903
VACUUM REGULATOR
Sven Alvar Svensson, Johanneshov, Sweden, assignor to Ingeniörsfirman Fliesberg AB, Stockholm, Sweden
Filed Nov. 20, 1962, Ser. No. 238,961
Claims priority, application Sweden, Nov. 21, 1961, 11,574/61
6 Claims. (Cl. 137—103)

This invention relates to a vacuum regulator for maintaining a predetermined vacuum in a space, such as suction boxes for paper making machines or the like.

Vacuum regulators for this purpose are known including a valve device connected to the evacuation conduit, to a vacuum source and to the ambient atmosphere respectively. A member actuated by the vacuum to be maintained constant is adapted to control the communication between said connections. In general the valve device includes a pressure balanced double seating valve for controlling the connection between the evacuation conduit and the vacuum source for increasing the vacuum and another seating valve arranged axially with respect to said double seating valve for controlling the connection between the evacuation conduit and the ambient atmosphere for decreasing the vacuum. Both seating valves are spring-loaded and actuated by mutually slidable members interconnected with a diaphragm motor subjected to the vacuum to be maintained constant.

However such vacuum regulators have drawbacks growing more pronounced due to the continually increasing demands for faster control speeds and more precise vacuum values. Said drawbacks depend among other on the very rapid change of flow rate as a function of the stroke of the seating valves, making it difficult for the control member to regulate the flow rate with sufficient sensitivity and accuracy.

Due to the increasingly faster working machines and the consequently faster dewatering of the suspension, such as the fibre layer at suction boxes in paper making machines, a great proportion of solid constituents such as fibres or other impurities is drawn into the evacuated space, said constituents having a tendency to be deposited on the sensitive seating surfaces and other movable parts of the regulator and thereby disturbing the function of the regulator. Said impurities are further difficult to remove and a cleaning of the regulator requires dismounting of the same with accompanying discontinuance of the running of the working machine.

It is an object of the present invention to remove said drawbacks and provide a vacuum regulator being reliable in operation, free from being soiled, easy to clean, having a wide control range for a precise control, and being insensitive against abrupt and heavy pressure changes.

According to the present invention there is provided for the connection of the evacuation conduit with the vacuum source and ambient atmosphere respectively butterfly valve means actuated by a common control member. The control member and its associated mechanism is located outside the passages through the vacuum regulator. In order to facilitate the cleaning of the butterfly valve means and passages of the vacuum regulator said butterfly valve means are located in register with each other and with the connection to the ambient atmosphere and have preferably a unidirected opening movement, so that the passage of the vacuum regulator is operable from outside without being dismounted. In closed position the valve plates of the buterfly valve means suitably take up an inclined position relative to a plane transverse to the respective passage of the regulator, said inclination being chosen to match the desired range of movement of the valve plate and the desired change of the flow rate as a function of the angular movement of the adjusting shaft of the butterfly valve means. Further, the butterfly valve means are spring-loaded towards closed position so that the valve plates may be moved by direct actuation on the valve plates against the bias force independent of the movement of the control member.

The invention will be further explained hereinafter with reference to the accompanying drawings showing by way of example an embodiment of a vacuum regulator according to the invention.

In the drawings FIG. 1 is a longitudinal section of the control mechanism of a vacuum regulator according to the invention, FIG. 2 is an elevational view of a vacuum regulator partially in section taken along line II—II in FIG. 1, and FIG. 3 is a section taken along line III—III in FIG. 2 showing butterfly valve means.

In the embodiment shown a valve body 1 has a first branch 2 adapted to be connected with a space to be evacuated through an evacuation conduit, a second branch 3 adapted for connection with a vacuum source and a third branch 4 adapted for connection with the ambient atmosphere. Said third branch 4 can be provided with a protecting cap 5 removably secured by screws 6. The valve body 1 includes in said second branch 3 butterfly valve means 7 shown by dotted lines in FIG. 1 and in the third branch 4 similar butterfly valve means 8 also shown by dotted lines in FIG. 1. Said three branches 2, 3 and 4 within the valve body 1 are in open communication with each other.

On the outer side of the valve body 1 a casing 9 is provided enclosing extensions of shafts 10, 11 of said butterfly valve means 7, 8 and control means for angularly moving the latter. Said casing 9 is by screws 12' secured to the valve body 1 and is closed by a cover 9'. In the interior of the casing 9 said extension of the shafts 10, 11 of the butterfly valve means 7, 8 are provided with levers 12 and 13 respectively. Said last mentioned lever 13 is partially shown in section. Compression springs 14 and 15 act on one end of the levers 12 and 13 to create a bias force keeping the butterfly valves 7 and 8 in closed position. Opposite ends of the levers 12, 13 are provided with rollers such as 16 on the lever 13, to be actuated by a control member, such as a longitudinally movable stem 17 located between the shafts 10, 11 of said butterfly valve means. Oppositely extending transverse arms 18, 19 are supported by said stem 17 to act on said rollers of the levers 12, 13. Said transverse arms 18, 19 are adjustably supported on the end portion of the stem 17 by means of nuts 20 and 21. A compression spring 22 between the arms 18, 19 urges said transverse arms in opposite directions against said nuts 20, 21. By this arrangement said arms 18, 19 can be adjusted mutually as well as in a desired position along said stem 17. Preferably the openings in the arms 18, 19 through which the stem 17 extends are somewhat larger than the cross section of the stem so that the arms 18, 19 can perform a limited swinging movement against the action of said intermediate compression spring 22. Thereby a protection against excessive movements of the stem 17 is assured as well as a cushioning action for taking up possible load peaks.

The valve control stem 17 extends through a bearing 23 of a diaphragm housing screwed to said casing 9. Said diaphragm housing consists of a lower portion 24 and an upper portion 25 secured to each other by means of screws 26. A diaphragm 27 is by means of rigid plates 28 fastened to the stem 17. Said diaphragm 27 divides the diaphragm chamber into two spaces. As is best shown in FIG. 2 the upper space is by a conduit 29 connected with the first branch 2 of the regulator adapted to be connected with the evacuation conduit. Thus the space above the diaphragm 27 will be subjected to the vacuum in the evacuation conduit and the diaphragm tends to move upwardly under the action of atmospheric pressure on the opposite or lower side of the diaphragm 27 against a counteracting resilient force. Said resilient or bias force may be created by spring means or as is shown on the drawings by fluid pressure, such as compressed air. For this purpose the upper part 25 of the diaphragm housing is shaped as a lower portion of an additional diaphragm chamber having an upper part 30 and a diaphragm 31 by means of rigid plates 32 secured to a further extension of the stem 17. Said further extension of the stem 17 is sealingly movable in an opening in a central portion 33 of the partition wall of the upper part 25 of the main diaphragm housing. The under side of the diaphragm 31 is preferably subjected to atmospheric pressure. The upper side of the diaphragm 31 is subjected to a constant air pressure supplied through a conduit 34. By suitable regulation of said air pressure an equalization between the opposite forces exerted by said two diaphragms 27 and 31 is obtained at a pre-determined value of the vacuum in the evacuation conduit. The advantage of said fluid pressure arrangement over a spring device is that the bias force acting on the stem 17 downwardly in FIGS. 1 and 2 is maintained constant independent of the position of the stem 17 in longitudinal direction. When screw spring means is used, the bias force will vary in accordance to the amount of compression of the spring.

In order to provide for a desired regulating velocity of the diaphragm 27 the communication between the lower part of the diaphragm housing 24, 25 and the atmosphere can be adjusted as is shown to the left of the lower portion 24 of the diaphragm housing. Said adjustable communication consists of a threaded bore through the flange of said lower portion 24 of the diaphragm housing and another bore 35 in right angles to said first bore. By aid of a screw 36 in said threaded bore a desired flow area can be obtained.

In operation said first and second branches 2 and 3 are connected to the evacuation conduit of a suction box or the like and a vacuum source respectively. By means of a pilot valve (not shown) a predetermined constant air pressure dependent on the desired constant vacuum in the evacuation conduit and suction box respectively is maintained in the upper diaphragm chamber 30. Assuming that no vacuum is present in the evacuation conduit or the vacuum in said conduit is lower than the predetermined vacuum the downward force created by the air pressure acting on the upper diaphragm 31 will overcome the upwardly directed force acting on the diaphragm 27. Thereby the stem 17 is moved downwardly and its one arm 18 will act on the lever 12 and swing it and consequently the butterfly valve 7 counterclockwise towards open position. At the same time the butterfly valve 8 is kept closed by its associated spring 15. The other arm 19 will simultaneously be moved out of engagement with its belonging lever 13.

Thereby the evacuation conduit is brought into communication with the vacuum source until a sufficient vacuum is obtained in the evacuation conduit and thus in the upper space of the diaphragm housing 24, 25 and then the upwardly directed force on the diaphragm 27 will balance the aforementioned downward force on the upper diaphragm 31 so that the stem 17 with its arms 18, 19 takes up an intermediate position in which both butterfly valves 7, 8 are closed.

On the contrary if the vacuum increases to below said predetermined value the upward force acting on the diaphragm 27 will be predominant and the stem 17 is moved upwardly resulting in an opening movement of the butterfly valve 8 whereby fresh air is permitted to enter into the evacuation conduit until said predetermined vacuum is re-established.

In FIG. 3 a detail of the butterfly valve 8 is shown. From said figure it is apparent that in this case the valve plate tightens against the surrounding walls with an inclination of about 45° to a plane transversely to the longitudinal axis of the passage. In this case the advantage of a free straight opening through the valve after a relatively small angular movement of the shaft 11 is obtained. Said angular movement ranges over not more than 45°. Of course such a large movement is not necessary for adjustment purposes since adjustments of the valve plate in the region near the longitudinal axis of the passage results in very small changes of the flow area only. By choosing a suitable inclination on the valve plate in closed position a desired character of the movement of the stem 17 in regard of different conditions can be easily obtained.

Even if a preferred embodiment of a vacuum regulator according to the invention has been shown and described said embodiment can be modified in different ways within the scope of the invention especially as to the location and detail construction of the butterfly valve means as well as of the control mechanism.

I claim:

1. In a vacuum regulator for maintaining a predetermined vacuum and including a valve body having branches in communication with an evacuation conduit, a vacuum source and the ambient atmosphere respectively and means actuated by the vacuum to be maintained for controlling the communication between said evacuation conduit and any of said other branches, the provision in each of said other branches of butterfly valve means in passages accessible from outside, each of said butterfly valve means having an operating lever outside said passages, said means actuated by the vacuum to be maintained constant comprising a diaphragm motor having a valve actuating stem provided with transverse arms adapted to move said levers positively in one direction only against a spring force.

2. A vacuum regulator as claimed in claim 1 in which said arms are slidable along the stem and are resiliently kept in position against oppositely located studs on said stem by an intermediate compression spring.

3. A vacuum regulator as claimed in claim 2 in which said studs consist of nuts screwed onto said stem.

4. A vacuum regulator as claimed in claim 3 in which the openings in the arms through which the stem extends are slightly larger than the cross section of said stem.

5. In a vacuum regulator for maintaining a predetermined vacuum and including a valve body having branches in communication with an evacuation conduit, a vacuum source and the ambient atmosphere respectively and control means actuated by the vacuum to be maintained constant for controlling the communication between said evacuation conduit and any of said other branches, said control means comprising each of said other branches having butterfly valve means in passages of said branches, each of said butterfly valve means being pivoted about an axis perpendicular to the longitudinal axis of the corresponding passage and being biased towards closure, and a common valve operating mechanism fluid-tightly separated from the passages of said branches, including a stem and a lost motion device between the stem and the valve means and including arms connected to said stem and each operable to engage with relation a valve means and to open it against said bias upon movement of said stem to predetermined positions off a median position in response to pressure changes and to be disengaged therefrom in all other positions, said operating mechanism thereby opening one valve means at one time only so that when the pressure increases it operates one of said valve means and when the pressure decreases it operates the other valve means.

6. In a vacuum regulator for maintaining a predetermined vacuum and including a valve body having branches in communication with an evacuation conduit, a vacuum source and the ambient atmosphere respectively and control means actuated by the vacuum to be maintained for controlling the communication between said evacuation conduit and any of said other branches, the provision in each of said other branches of butterfly valve means tiltable in passages of said branches in register with each other and with a passage of the branch leading to the ambient atmosphere, said control means comprising a common operating mechanism outside said passages and including a first diaphragm motor subjected to the vacuum to be maintained constant and having an operating stem operable to actuate said butterfly valve means, a second diaphragm motor working in opposite direction to said first diaphragm motor and being subjected to a preadjusted constant fluid pressure, said stem being connected to said second diaphragm motor.

References Cited by the Examiner

UNITED STATES PATENTS

| | | | |
|---|---|---|---|
| 2,154,171 | 4/1939 | Kuiper | 137—153 |
| 2,163,597 | 6/1939 | Groove | 137—489.5 |
| 2,202,997 | 6/1940 | Scott | 137—103 |
| 2,950,730 | 8/1960 | Svensson | 137—116.3 |

ISADOR WEIL, *Primary Examiner.*

M. CARY NELSON, *Examiner.*

J. DEATON, *Assistant Examiner.*